United States Patent [19]

Tamamura

[11] Patent Number: 5,182,589
[45] Date of Patent: Jan. 26, 1993

[54] CAMERA USING FILM WITH MAGNETIC RECORDING PORTION HAVING FILM FEEDING MOTOR POSITIONED TO MINIMIZE THE EFFECT OF NOISE THEREFROM

[75] Inventor: Hideo Tamamura, Yokohama, Japan

[73] Assignee: Canon Kabushiki Kaisha, Tokyo, Japan

[21] Appl. No.: 701,867

[22] Filed: May 17, 1991

[30] Foreign Application Priority Data

May 18, 1990 [JP] Japan .................................. 2-128408

[51] Int. Cl.⁵ .............................................. G03B 17/24
[52] U.S. Cl. .................................. 354/105; 354/173.1; 318/128
[58] Field of Search ................... 354/105, 106, 173.1, 354/173.11, 212; 318/128

[56] References Cited

U.S. PATENT DOCUMENTS 4,795,929  1/1989  Elgass et al. ........................ 318/128
4,864,332  9/1989  Harvey ................................. 354/21

Primary Examiner—W. B. Perkey
Assistant Examiner—Cassandra Spyrou
Attorney, Agent, or Firm—Fitzpatrick, Cella, Harper & Scinto

[57] ABSTRACT

A camera using film with a magnetic recording portion, is provided with a magnetic head for effecting the writing or reading-out of information onto or from the magnetic recording portion of the film during feeding of the film, and a motor for feeding the film. The motor has a commutator and brushes contacting with the commutator, and is disposed so that the tangential direction of brushes with respect to the commutator may be substantially parallel to a line linking the output shaft of the motor and the head gap of the magnetic head together.

6 Claims, 5 Drawing Sheets

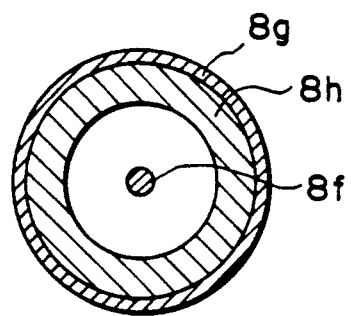 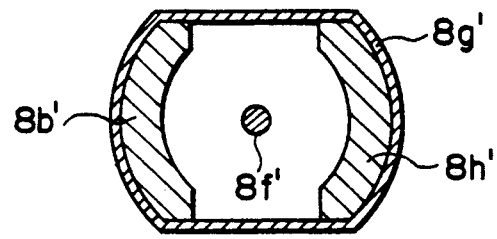
F I G. 3   F I G. 5
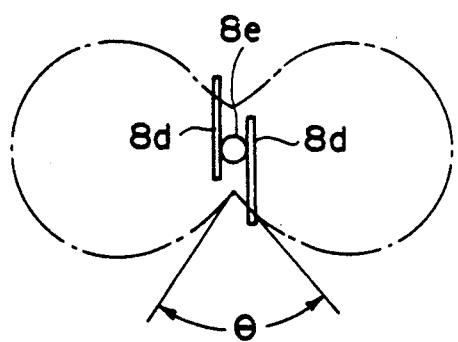 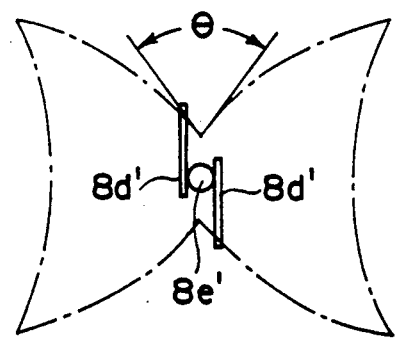
F I G. 4   F I G. 6

CAMERA USING FILM WITH MAGNETIC RECORDING PORTION HAVING FILM FEEDING MOTOR POSITIONED TO MINIMIZE THE EFFECT OF NOISE THEREFROM

BACKGROUND OF THE INVENTION

1. Field of the Invention

This invention relates to a camera using a film with a magnetic recording portion to effect writing or reading of information onto or from the magnetic recording portion.

2. Related Background Art

A camera using a film having a magnetic recording portion to write information onto the magnetic recording portion by a magnetic head and reading the information from the magnetic recording portion as required is disclosed in U.S. Pat. No. 4,864,332, etc.

However, the writing and reading-out of such information is effected during the feeding of the film and if an attempt is made to effect the feeding of the film by a motor, there will arise the inconvenience that the magnetic head for effecting the writing and reading-out of said information during the feeding of the film malfunctions due to the noise of the motor which effects the feeding of the film.

Particularly in recent years, cameras have become compact and it has become usual that said motor and said magnetic head are disposed to be more adjacent to each other and therefore, the above-described inconvenience provides a greater problem.

SUMMARY OF THE INVENTION

The present invention has been made in view of the above-noted circumstances and a object thereof is to provide a camera using film with a magnetic recording portion, which camera is provided with a magnetic head for effecting the writing or reading-out of information onto or from the magnetic recording portion of the film during the feeding of the film, and a motor for feeding the film, said motor having a commutator and a brush contacting with the commutator, said motor being disposed so that the tangential direction of the brush with respect to the commutator may be substantially parallel to a line linking the output shaft of the motor and the head gap of the magnetic head together, said magnetic head being positioned in a direction which minimizes the noise of said motor, whereby the magnetic head for effecting the writing or reading-out of the information onto or from the magnetic recording portion of the film during the feeding of the film is prevented from malfunctioning due to the noise of the film feeding motor occurring from the film feeding being effected.

Another object of the present invention is to provide in the camera as described above position adjusting means for rotating the film feeding motor within a range of nearly 90° about the output shaft of said motor, and adjusting the direction of the motor relative to the magnetic head, thereby improving the working efficiency during assembly.

Other objects of the present invention will become apparent from the following detailed description of some specific embodiments of the invention.

BRIEF DESCRIPTION OF THE DRAWINGS

FIGS. 3 and 5 are cross-sectional views showing the constructions of various motors used in the camera of FIG. 1.

FIGS. 4 and 6 show the noise generating areas of the motors shown in FIGS. 3 and 5.

DESCRIPTION OF THE PREFERRED EMBODIMENTS

Some embodiments of the present invention will hereinafter be described in detail with reference to the drawings.

Figure 1:
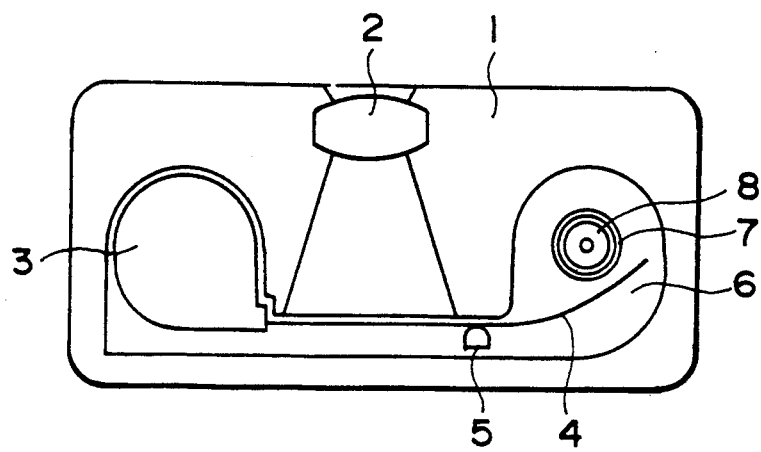
FIG. 1 is a transverse cross-sectional view of a camera according to a first embodiment of the present invention.

Referring to FIG. 1 which is a transverse cross-sectional view of a camera according to a first embodiment of the present invention, reference numeral 1 designates a camera body, the reference numeral 2 denotes a photo-taking lens, the reference numeral 3 designates a film cartridge, the reference numeral 4 denotes film provided with a magnetic recording portion, the reference numeral 5 designates a magnetic head for effecting the writing or reading-out of information onto or from the magnetic recording portion of the film during the feeding of the film, the reference numeral 6 denotes a spool chamber, the reference numeral 7 designates a spool, the reference numeral 8 denotes a film feeding motor, and the referenced character 8d denotes a pair of brushes.

Figure 2:
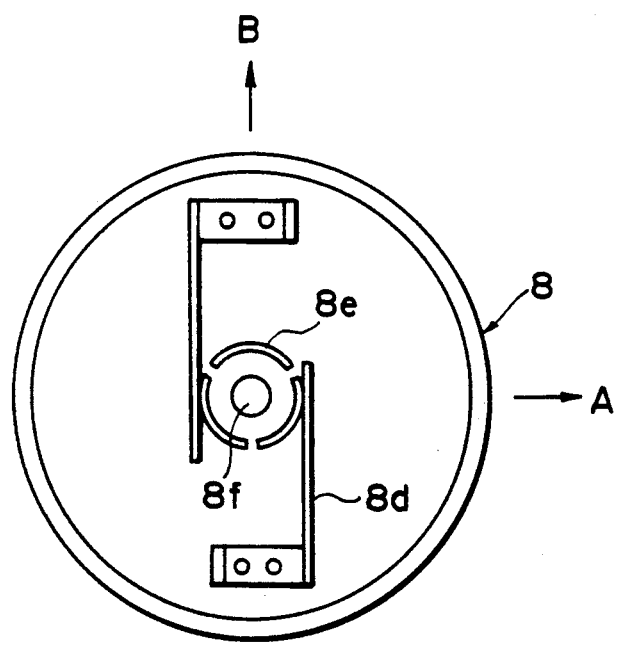
FIG. 2 is a view for illustrating the positional relation between the commutator and brush of the motor of FIG. 1 and the generating force of noise.

FIG. 2 shows the structure of the commutator or the like of the motor 8 as it is seen from on the output shaft of the motor. In FIG. 2, the reference character 8d designates a brush, the reference character 8e denotes a commutator, and the reference numeral 8f designates the output shaft. The motor shown there is a three-pole motor. It has been empirically found that in such a motor 8, noise is generated more in the direction of arrow A than in the direction of arrow B.

FIGS. 3 to 6 are views for explaining such noise generation force (a portion indicated by dot-and-dash line in FIGS. 4 and 6) in detail.

The noise of the motor is generated by the contact between the brush 8d and the commutator 8e being sharply varied, and it has been empirically found as described above that the noise generation force differs depending on the direction of the brush 8d.

FIG. 3 shows a motor using a conventional cylindrical magnet 8h, and in this motor, as shown in FIG. 4, the noise generation force differs depending on the position of the brushes 8d, and as shown, noise is relatively small in the area of an angle θ in the lengthwise direction of the brushes 8d. In FIG. 3, the reference character 8g designates the outer cylinder of the motor.

FIG. 5 shows a motor in which a magnet 8h' is of such a shape that the upper and lower portions of a cylinder are planed, and again in this case, as shown in FIG. 6, noise is relatively small in the area of an angle θ' in the lengthwise direction of the brushes 8d'.

The above-mentioned areas in which noise is relatively small, i.e., the angles θ and θ', were nearly 40°.

The positional relation between the magnetic head 5 and the motor 8 shown in FIG. 1 is set with the result of the experiment as described above taken into account. More particularly, the motor 8 is disposed so that the magnetic head 5 may lie in said area of the angle θ wherein noise generated in the motor 8 is relatively small, that is, the tangential direction of the brush 8d with respect to the commutator 8e (the lengthwise direction of the brushes 8d) may be substantially parallel to a line linking the output shaft 8f of the motor 8 and the head gap (not shown) of the magnetic head 5 together.

Accordingly, this leads to the possibility of eliminating the inconvenience that the writing or reading-out of information effected by the magnetic head 5 during the feeding of the film is prevented from being accurately accomplished by the noise of the film feeding motor generated by the feeding of the film being effected.

Figure 7:
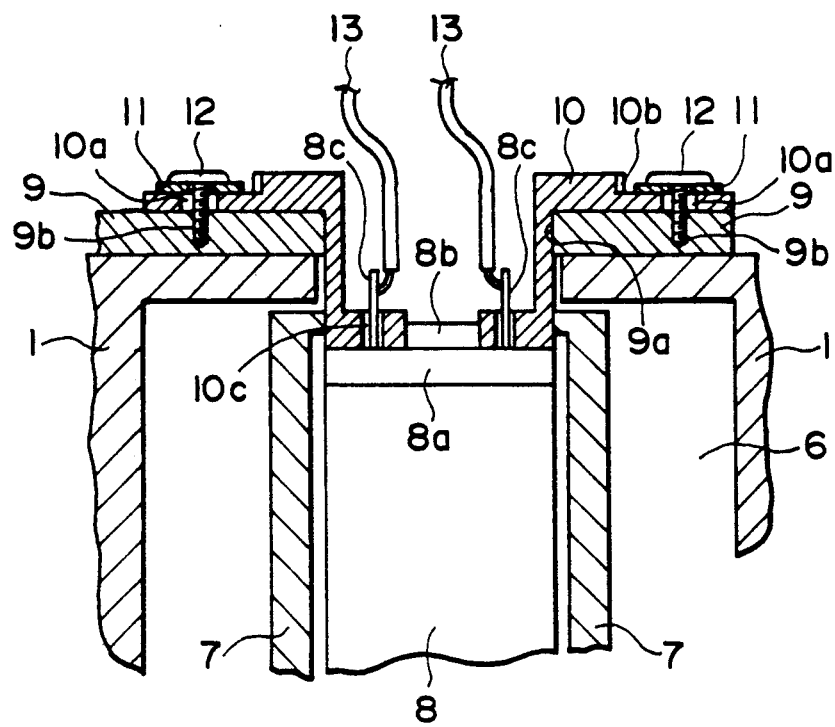
FIG. 7 is a cross-sectional view taken along the line D—D of FIG. 9.
Figure 8:
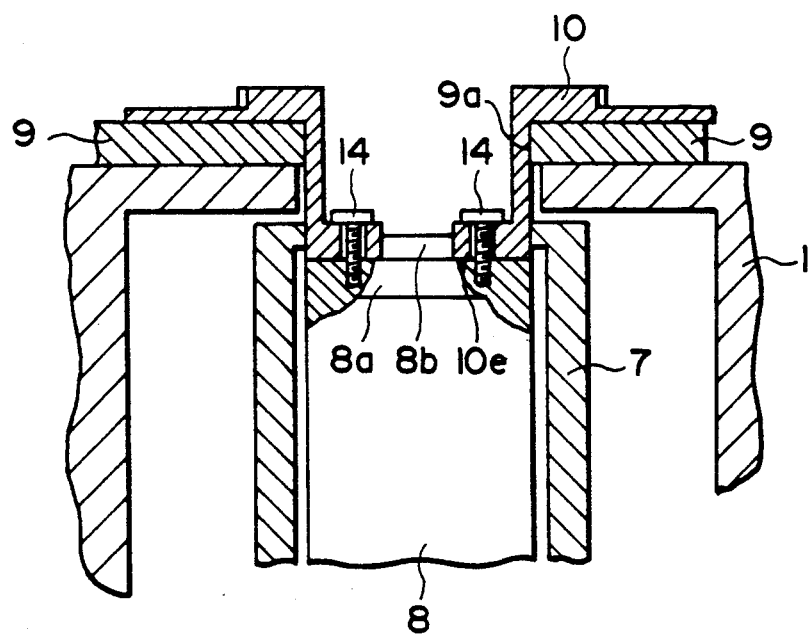
FIG. 8 is a cross-sectional view taken along the line C—C of FIG. 9.
Figure 9:
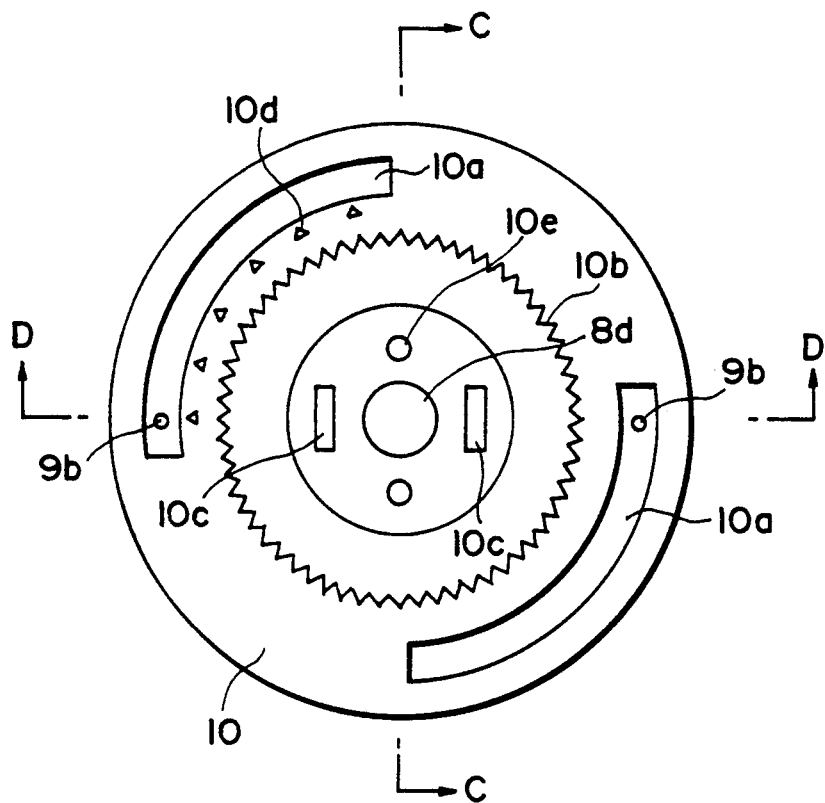
FIG. 9 is a top plan view of a camera showing the essential portions of a second embodiment of the present invention.
Figure 10:
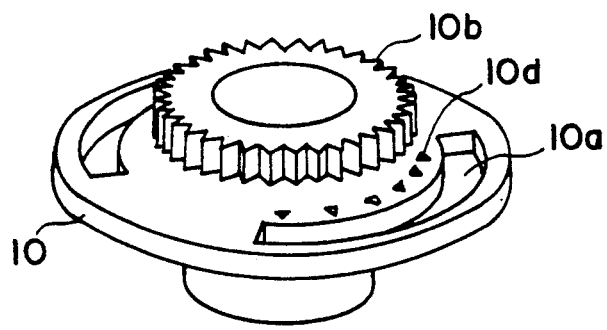
FIG. 10 is a perspective view of a position adjusting mechanism shown in FIG. 9.

FIGS. 7 to 10 show a second embodiment of the present invention. FIG. 7 is a cross-sectional view taken along the line D—D of FIG. 9, FIG. 8 is a cross-sectional view taken along the line C—C of FIG. 9, FIG. 9 is a top plan view of the vicinity of a portion of a camera in which the motor of the camera is disposed and showing the essential portions of the present embodiment, and FIG. 10 is a perspective view of the position adjusting mechanism of FIG. 9.

In the above-described first embodiment, it is necessary that the motor 8 be accurately disposed at the position relative to the magnetic head 5 as previously described during assembly, whereas in this embodiment, the position adjustment relative to the magnetic head 5 can be made after assembly to thereby enhance the working efficiency. In the present embodiment, members similar in construction to those in the previous embodiment are given similar reference characters (this also holds true of the other embodiments).

In these figures, the motor 8 has a rear lid 8a and a convex portion 8b, and two terminals 8c protrude from the rear lid 8a, lead wires 13 being soldered to the terminals 8c. The reference numeral 9 designates a ground plate integral with the camera body 1. A motor mounting ground plate 10 is rotatably fitted in an aperture 9a, and rests on the ground plate 9. Two slots 10a are formed in the motor mounting ground plate 10, and as is apparent from FIGS. 9 to 10, these slots 10a are formed over nearly 90°. This is because as indicated by arrows A and B in FIG. 2, noise changes from a maximum direction to a minimum direction at the maximum of 90°. The motor mounting ground plate 10 is fixed to the ground plate 9 by screws 12 and washers 11 through the slots 10a. A position adjusting portion 10b is formed into a gear like shape as shown in FIG. 10, and is designed to be manually rotated or rotated by means of a tool gear when the position (the angle of rotation) of the motor 8 is to be adjusted. The reference character 10c denotes apertures through which the terminals 8c protrude outwardly. The motor 8 is fixed (see FIG. 8) to the motor mounting ground plate 10 by screws 14 by the utilization of apertures 10e located at positions 90° out of phase with respect to the apertures 10c through which the terminals 8c protrude, as shown in FIG. 9. Marks 10d provided along one of the slots 10a in the motor mounting ground plate 10 are for roughly confirming how much the motor 8 has been rotated, and for example, in the case of a motor of the same lot, the motor can be rotated to the position of substantially the same mark and stopped thereat, thereby obtaining the same effect.

The position adjustment of the motor 8 in this embodiment, as is clear from the foregoing description, is completed by rotating the position adjusting portion 10b about the output shaft 8f of the motor 8, manually or by the use of a tool gear, within the range of about 90° to a position in which the magnetic head 5 comes into the area of said angle θ in which generated noise is relatively small, and fixing the motor to the ground plate 9 by means of the screws 12 and the washers 11 through the slots 10a formed in the motor mounting ground plate 10.

Figure 11:
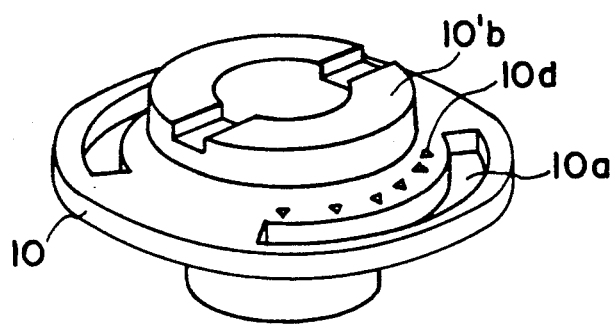
FIG. 11 is a perspective view showing another example of the construction of the position adjusting mechanism.

FIG. 11 shows another example of the construction of the position adjusting portion 10b for rotating the motor mounting ground plate 10 of FIG. 10. As shown, the position adjusting portion 10b' is formed with a groove, and by rotating it as by a suitable tool such as a pin face driver, the position adjustment of the motor 8 becomes possible.

Figure 12:
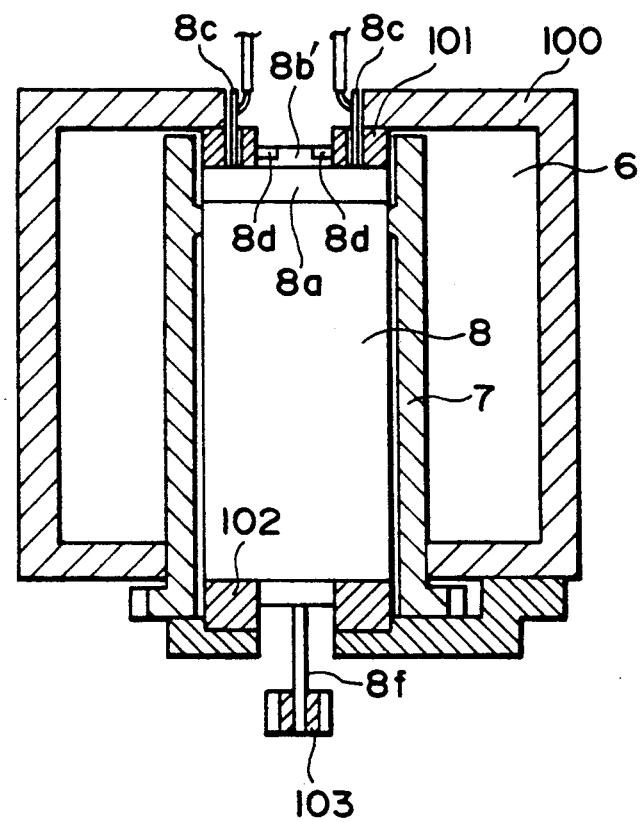
FIG. 12 is a longitudinal cross-sectional view of a camera according to a third embodiment of the present invention.

FIG. 12 shows a third embodiment of the present invention. The difference of this embodiment from the above-described embodiments lies in the portion to which the motor 8 is fixed.

The motor 8 is compressed and fixed from above and below it by elastic members 101 and 102 of rubber or like material, and such a construction also provides a countermeasure for noise. The position adjustment of the motor 8 in this case can be accomplished by rotating grooves 8d formed in the rear lid 8b' of the motor 8 by a pin face driver in the same manner as previously described. In FIG. 12, the reference numeral 103 designates an output gear secured to the output shaft 8f of the motor 8.

As described above, according to each of the above-described embodiments, attention is paid to the fact that the noise generated during film feeding by the film feeding motor 8 is not generated at the same level in any direction, and the motor 8 is rotated and fixed so that the magnetic head 5 for effecting the writing or reading-out of information onto or from the magnetic recording portion of the film during the feeding of the film may lie within a range (area) in which generated noise is relatively small, and therefore the noise to which the magnetic head 5 is subjected can be made small and any malfunctioning can be prevented from occurring to the writing or reading-out of information onto or from the film with the magnetic recording portion. Particularly, from the result of the experiment, it has been found that the noise generation force is small in the range of nearly 40°, and if the magnetic head 5 is disposed within this range, malfunctioning as the result of noise can be eliminated.

Also, by providing the position adjusting mechanism from which the angle of rotation of the motor 8 can be known, as in the above-described embodiments, the position adjustment of the motor 8 can be effected at the final stage of assembly and motors of the same lot can be likewise adjusted and thus, the working efficiency during assembly can be greatly improved.

I claim:

1. A camera using film with a magnetic recording portion, said camera comprising:
   (A) a magnetic head for effecting a writing or reading of information onto or from the magnetic recording portion of the film during a feeding of the film; and
   (B) a motor for feeding said film, said motor having a commutator and brushes contacting with said commutator, said motor being disposed so that a tangential direction of said brushes with respect to said commutator may be substantially parallel to a line linking an output shaft of said motor and said magnetic head.

2. A camera according to claim 1, further comprising position adjusting means for rotating said motor about an output shaft thereof and adjusting the position of said motor.

3. A camera according to claim 1, further comprising position adjusting means for rotating said motor about an output shaft thereof within a range of nearly 90° and adjusting the position of said motor.

4. A camera using film with a magnetic recording portion, said camera comprising:
   (A) a magnetic head located opposite to the magnetic recording portion of the film, said magnetic head writing and reading information onto or from said magnetic recording portion;
   (B) a motor for feeding the film, said motor having a commutator and brushes in contact with said commutator, said motor being movable with respect to a body of said camera such that a tangential direction of said brushes with respect to said commutator is substantially parallel to a line linking an output shaft of said motor and said magnetic head.

5. A camera according to claim 4, further comprising a substrate, wherein said motor is fixedly mounted on said substrate and, said substrate is rotatably disposed with respect to said camera body within a predetermined angular range.

6. A camera according to claim 4, wherein said motor is mounted on said camera body by means of a resilient member.

* * * * *